United States Patent

Rabatin et al.

[15] 3,666,676
[45] May 30, 1972

[54] TERBIUM ACTIVATED RARE EARTH OXYHALIDE PHOSPHORS CONTAINING YTTERBIUM FOR REDUCED AFTERGLOW

[72] Inventors: Jacob G. Rabatin, Chardon; Evelyn Bradshaw, East Cleveland, both of Ohio

[73] Assignee: General Electric Company

[22] Filed: Dec. 21, 1970

[21] Appl. No.: 100,448

[52] U.S. Cl. .................................................... 252/301.4 R
[51] Int. Cl. ............................................................. C09k 1/08
[58] Field of Search ............................................. 252/301.4 R

[56] References Cited

UNITED STATES PATENTS 3,546,128  12/1970  Rabatin .......................... 252/301.4 R
3,607,770  9/1971   Rabatin .......................... 252/301.4 R

OTHER PUBLICATIONS

Blasse et al., Investigation of $Tb^{3+}$ Activated Phosphors, Philips Research Reports 22(S) 1967 pgs. 481–504.

*Primary Examiner*—Robert D. Edmonds
*Attorney*—Henry P. Truesdell, Frank L. Neuhauser, Oscar B. Waddell, Joseph B. Forman and John F. McDevitt

[57] ABSTRACT

Phosphors of reduced afterglow having the inclusion of a selected impurity in the phosphor lattice. More specifically, rare earth oxyhalide phosphors of reduced phosphorescence comprising lanthanum and gadolinium oxyhalide phosphors activated with terbium including the selected impurity ytterbium.

2 Claims, No Drawings

TERBIUM ACTIVATED RARE EARTH OXYHALIDE PHOSPHORS CONTAINING YTTERBIUM FOR REDUCED AFTERGLOW

BACKGROUND OF THE INVENTION

The present invention relates to rare earth oxyhalide phosphors activated with terbium, and particularly, to such rare earth oxyhalide phosphors having reduced afterglow or phosphorescence.

The rare earth oxyhalides activated with terbium are finding increasing use as phosphors in X-ray intensifier screens and similar radiographic devices, replacing past conventional phosphors of less desirable properties. For example, LaOBr:Tb has about a 50 percent greater absorption of incident X-rays and about three to four times greater blue emission than the previously used $CaWO_4$. Currently intensifier screens are provided with photographic films which tend to fog if a phosphor is used having an afterglow or long persistent phosphorescence of appreciable intensity. With the use of these long afterglow phosphors, any movement of the film relative to the phosphor screen immediately after exposure will result in blurred images. Attempts to eliminate the problem of blurred images in X-ray intensifier screens have been generally unsuccessful because any reduction in duration and intensity of the phosphor afterglow normally has been at the expense of the overall phosphor efficiency.

The present invention eliminates the problem of blurred images by providing rare earth oxyhalide phosphors with significantly reduced afterglow without an appreciable loss in phosphor efficiency.

Accordingly, it is an object of the present invention to provide a rare earth oxyhalide phosphor activated with terbium having a reduced afterglow.

It is a further object of the present invention to provide a terbium-activated lanthanum or gadolinium oxychloride or oxybromide phosphor including a selected impurity to achieve reduced afterglow.

Further objects and attendant advantages will be apparent from the following summary and detailed description.

SUMMARY OF THE INVENTION

The present invention relates to terbium-activated rare earth oxyhalide phosphors having a selected impurity for reducing the phosphors' afterglow. More specifically, the present invention relates to rare earth oxyhalide phosphors including ytterbium as an impurity and having the general formula:

$$M_{1-w-y}OX:Tb_wYb_y$$

wherein M is an element selected from the group consisting of La and Gd; X is an element selected from the group consisting of Cl and Br; and w is from 0.0005 to 0.03 moles per mole of the selected oxyhalide; and y is from 0.00005 to 0.005 moles per mole of the selected oxyhalide.

DETAILED DESCRIPTION OF THE INVENTION

The phosphors of the present invention are useful in various radiographic intensifier screens and include certain lanthanum and gadolinium oxyhalide phosphors activated with terbium. A small amount of a selected impurity, ytterbium, is incorporated in the phosphor lattice in order to reduce the afterglow of the phosphor without any appreciable decrease in the overall phosphor efficiency.

The following are a few of the rare earth oxyhalide phosphors included in this invention:

$La_{0.997}OBr:Tb_{0.002},Yb_{0.001}$
$La_{0.994}OCl:Tb_{0.005},Yb_{0.001}$
$Gd_{0.994}OBr:Tb_{0.005},Yb_{0.001}$
$Gd_{0.994}OCl:Tb_{0.005},Yb_{0.001}$

The ytterbium impurity addition of the present invention is made by the oxalate precipitation method. This method is outlined below for the preparation of the $La_{0.9975}OBr:Tb_{0.002},Yb_{0.0005}$.

In this first step of the preparation, lanthanum oxide (2,330g), terbium oxide (5.4g), and ytterbium oxide (0.0141g) are dissolved in a mixture of concentrated nitric acid (3,055 ml) and water (11,615 ml). This mixture is then coprecipitated with 10 percent oxalic acid (40,600 ml) to form the oxalates of lanthanum, terbium and ytterbium. The oxalates are then fired to effect the chemical conversion of the oxalates to the mixed oxides of lanthanum, terbium and ytterbium at 1,000° C. for 2 hours in open boats.

The mixed oxides of lanthanum, terbium and ytterbium (2,230g) are blended thoroughly with ammonium bromide (1,440g) and fired 2 hours at 425° C. in covered boats to chemically form the phosphor, terbium-activated lanthanum oxybromide containing ytterbium. This phosphor (3,000g) is recrystallized by thoroughly blending it with potassium bromide (531g) and refiring at 1,000° C. for 2 hours in covered boats to form recrystallized larger particle-sized, terbium-activated lanthanum oxybromide containing ytterbium. Molten potassium bromide serves as a crystal-growing medium in this firing in order to produce well-crystallized terbium-activated lanthanum oxybromide containing ytterbium. The material is then washed to remove the potassium bromide. It is subsequently dried in an oven for 2 hours at 80° C., and then sifted through 325 mesh.

The effect of ytterbium on the reduction of afterglow in $LaOBr:Tb_{0.002}$ is shown in Table I.

TABLE I

The Effect of Ytterbium on the Reduction Of Afterglow Properties of $LaOBr:Tb_{0.002}$

| Moles of Ytterbium Per Mole Of Phosphor | Relative Phosphor Brightness Under X-ray Excitation | Phosphorescence Intensity In Volts After Indicated Time in Sec. | | | | |
|---|---|---|---|---|---|---|
| | | 0.01 | 1 | 3 | 9 | 52 |
| .00 | 100% | .51 | .41 | .38 | .32 | .15 |
| .0005 | 100% | .35 | .17 | .10 | .05 | .00 |
| .0010 | 100% | .30 | .04 | .01 | .00 | .00 |
| .0020 | 94% | .25 | .00 | .00 | .00 | .00 |

As can be seen from the above table, the addition of ytterbium results in a marked decrease in afterglow intensity. However, as can also be seen from the above table, the addition of up to 0.001 mole ytterbium results in no reduction in the relative phosphor brightness under X-ray excitation. Even the addition of 0.002 mole ytterbium results in a phosphor of 94 percent phosphor brightness of $LaOBr:Tb_{0.002}$ without ytterbium.

Table II shows the effectiveness of ytterbium in reducing afterglow intensities in other rare earth oxyhalide phosphors of the present invention.

TABLE II

Effect of Ytterbium on the Afterglow Intensities Of Various Rare Earth Oxyhalides Activated with Terbium

| Phosphor Composition | Moles of Ytterbium Per Mole of Phosphor | Phosphorescence Intensity In Volts After Indicated Time in Sec. | | | |
|---|---|---|---|---|---|
| | | 0 | 1 | 3 | 52 |
| $LaOCl:Tb_{0.00005}$ | .0000 | .28 | .18 | .12 | .02 |
| " | .0002 | .23 | .09 | .04 | .00 |
| " | .0010 | .17 | .03 | .01 | .00 |
| $GdOBr:Tb_{0.00005}$ | .0000 | .31 | .25 | .18 | .00 |
| " | .0010 | .24 | .02 | .00 | .00 |
| $GdOCl:Tb_{0.00005}$ | .0000 | .37 | .15 | .10 | .01 |
| " | .0010 | .25 | .00 | .00 | .00 |

MEASUREMENTS OF PHOSPHORESCENCE DECAY

All decay measurements were made with an X-ray generator set at 90KV peak and at a milliampere setting to give 15 volt constant output as read on an image storing oscilloscope when an S-11 photomultiplier was set at 800 volts. 0.8 grams of phosphor was pressed into a plastic sample holder of 30 mm diameter. The sample was placed about 3 inches above the generator target. The photomultiplier was set about 4 inches above the sample holder. The decay curves were recorded on the oscilloscope face with the photomultiplier set at 1,400 volts and the oscilloscope set at a sweep of 5 seconds per cm and at a sensitivity of 0.05 volt per cm. The phosphor was exposed to the X-rays for 10 seconds after which the X-rays were turned off and the decay measurements were made.

What is claimed as new and desired to be secured by Letters Patent of the United States is:

1. A rare earth oxyhalide phosphor of reduced afterglow having the general formula:

$$M_{1-w-y}OX{:}Tb_w Yb_y$$

wherein M is an element selected from the group consisting of La and Gd;

X is an element selected from the group consisting of Cl and Br;

$w$ is from 0.0005 to 0.03 moles per mole of the selected oxyhalide; and $y$ is from 0.00005 to 0.005 moles per mole of the selected oxyhalide.

2. A rare earth oxyhalide phosphor of reduced afterglow according to claim 1 wherein:

M is La
X is Br
$w$ is 0.002
$y$ is 0.0005.

* * * * *